United States Patent
Belanger

(10) Patent No.: US 11,154,899 B2
(45) Date of Patent: Oct. 26, 2021

(54) HOT MELT GLUE GUN HAVING NEEDLE VALVE

(71) Applicant: Adhesive Technologies, Inc., Hampton, NH (US)

(72) Inventor: Richard A. Belanger, Kensington, NH (US)

(73) Assignee: Adhesive Technologies, Inc., Hampton, NH (US)

( * ) Notice: Subject to any disclaimer, the term of this patent is extended or adjusted under 35 U.S.C. 154(b) by 0 days.

(21) Appl. No.: 17/201,043

(22) Filed: Mar. 15, 2021

(65) Prior Publication Data

US 2021/0283645 A1    Sep. 16, 2021

Related U.S. Application Data

(60) Provisional application No. 62/989,922, filed on Mar. 16, 2020.

(51) Int. Cl.
*B05C 17/005*   (2006.01)
*B05C 5/02*   (2006.01)

(52) U.S. Cl.
CPC ............ *B05C 17/0053* (2013.01); *B05C 5/02* (2013.01); *B05C 5/0229* (2013.01); *B05C 17/00533* (2013.01); *B05C 17/00546* (2013.01)

(58) Field of Classification Search
CPC .......... B05C 17/0053; B05C 17/00546; B05C 17/00526; B05C 17/00533; B05C 17/00536; B05C 17/0054; B05C 17/00543; B05C 5/02; B05C 5/0225; B05C 5/0229
USPC ................. 401/1, 2; 222/146.1, 146.2, 146.5
See application file for complete search history.

(56) References Cited

U.S. PATENT DOCUMENTS

| | | | | |
|---|---|---|---|---|
| 3,818,930 A * | 6/1974 | Crum | .................... | B29B 13/022 137/341 |
| 3,964,644 A * | 6/1976 | Wallace | ............ | B05C 17/00543 222/146.5 |
| 4,804,110 A * | 2/1989 | Sperry | .............. | B05C 17/00536 222/56 |
| 6,558,059 B1 * | 5/2003 | Hillinger | ........... | B05C 17/00536 222/146.2 |
| 7,520,408 B1 * | 4/2009 | Smith | ................. | B05C 17/0053 219/200 |

* cited by examiner

*Primary Examiner* — David J Walczak
(74) *Attorney, Agent, or Firm* — Clark & Brody LP

(57) ABSTRACT

A hand-held hot melt glue gun having a melt chamber, a needle and a nozzle that is movable with respect to the needle to open or close a discharge port in fluid communication with the melt chamber. A spring closure urges the needle and nozzle toward relative positions to close the discharge port. An opening element moves the nozzle with respect to the needle to open the discharge port, and a trigger mechanism is provided for advancing solid glue into the melt chamber and for operating the opening element. A time delay mechanism provides a time delay between the opening of the discharge port and advancement of glue into the melt chamber.

4 Claims, 3 Drawing Sheets

HOT MELT GLUE GUN HAVING NEEDLE VALVE

TECHNICAL FIELD

This invention relates to the art of dispensers for hot melt glue, such as hot melt glue guns.

BACKGROUND

It is common for a known hot melt glue gun to continue dispensing melted glue, or "drip", after the user ceases a dispensing event. For example, a common type of glue gun receives a stick of solid glue and has a trigger-operated mechanism for engaging the glue stick and advancing it into a heated melting chamber in response to a user pulling the gun's trigger. Pressure in the melted glue generated by advancing the glue stick into the melt chamber typically opens a ball valve in the nozzle of the glue gun and allows the melted glue to be dispensed. Melting the solid glue in the glue stick as it is advanced into the melting chamber, however, causes expansion of the glue as explained in U.S. Pat. No. 10,486,186. The resulting pressure in the melting chamber due to this expansion tends to cause continued release of melted glue even after the user has released pressure on the trigger mechanism, causing dripping.

Another known type of nozzle valve comprises a stationary needle located inside a movable nozzle. The movable nozzle is urged into contact with the stationary needle by a compression spring to prevent the flow of material, such as melted glue, through the nozzle. One advantage of this type of nozzle is its firm shut-off of the flow of material. Generally, the nozzle is opened through a separate mechanism that operated independently of the pressure in the material to be dispensed. This type of nozzle has only been used in glue guns having a controllable source of pressure in the material being dispensed. One such source of pressure is a controllable pump. This type of nozzle has not been used with inexpensive hand-held glue guns of the type disclosed herein, where a user squeezes a trigger to advance a glue stick into a melt chamber to dispense glue.

SUMMARY OF THE INVENTION

In accordance with the invention, a trigger-operated handheld glue gun is provided with a dispensing nozzle comprising a stationary needle in a cavity in a movable nozzle. The movable nozzle is urged against the stationary needle by a compression spring to provide a firm shut off even when the pressure in the melted glue tends to open the nozzle. This effectively prevents dripping.

The movable nozzle is pushed away from the needle by an actuating lever to open the nozzle. The spring urging the nozzle against the needle is strong enough to prevent normal pressures of the melted glue from being able to push the nozzle open, but this can result in giving a user an unnatural feel when using the gun. That is, if the trigger and nozzle mechanisms operate simultaneously the user will experience a larger than expected resistance to movement of the trigger until the nozzle opens, at which point the resistance to movement of the trigger will decrease to normal.

Thus, in accordance with the invention a mechanism is provided to open the nozzle in response to application of pressure on the trigger before a force is applied to advance the glue stick. This provides the user with trigger pressures similar to known glue guns with spring-operated ball valves.

In one embodiment a glue gun trigger mechanism is provided with a feature that allows the trigger to move a certain distance before applying a force to the glue stick advancing mechanism, that distance being adequate to allow the trigger to open the nozzle. Thus, unnatural back pressure on the glue stick is prevented and a smooth operation results.

In a preferred embodiment, one link in a trigger mechanism is provided with a slot that engages a pin in a connected link to delay advancement of the glue stick with respect to opening of the nozzle, whereby the nozzle is opened before pressure is applied to the glue by advancement of the glue stick.

DETAILED DESCRIPTION OF THE INVENTION

Figure 1:
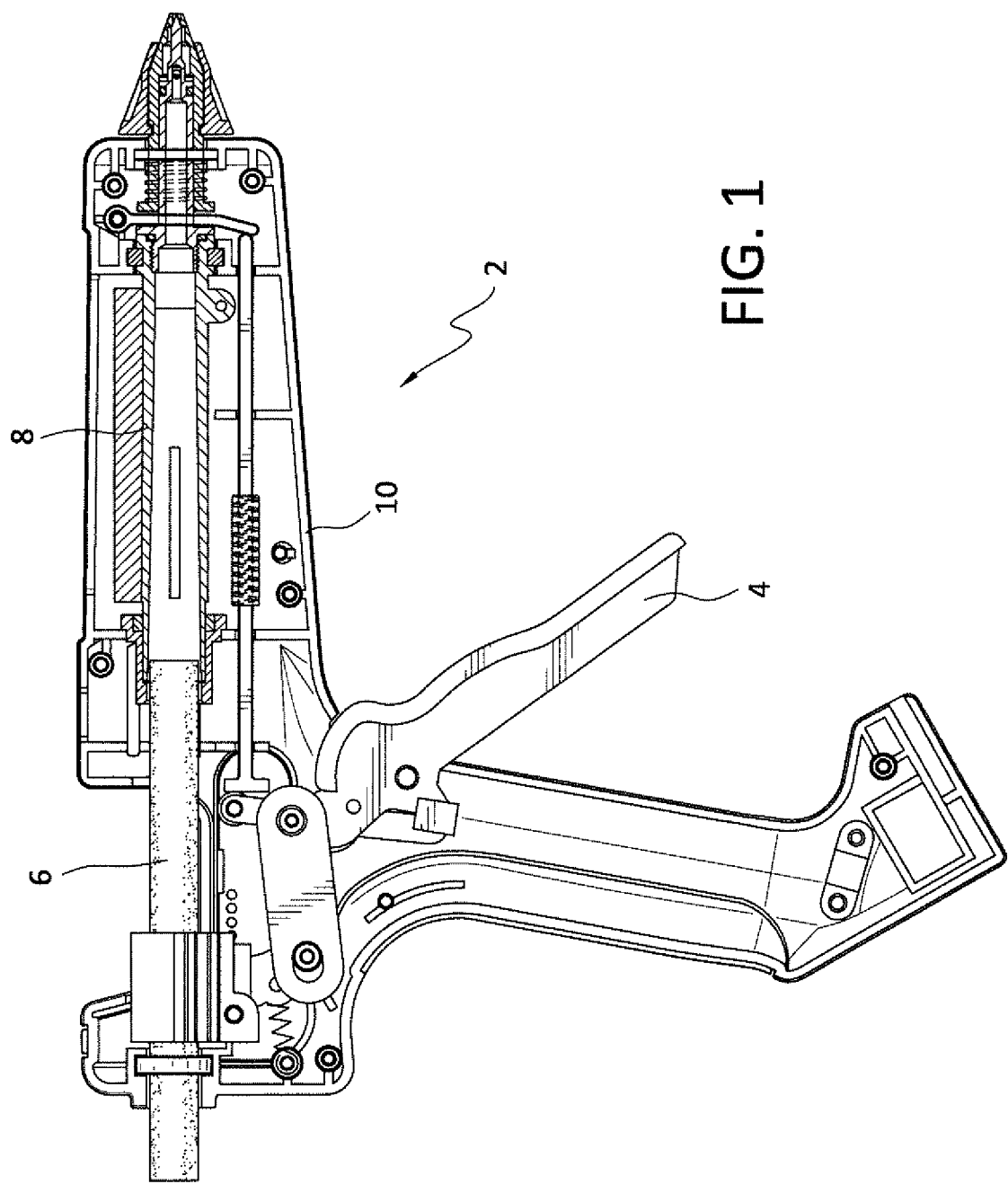
FIG. 1 is a side view of one half of a trigger-operated hot melt glue gun showing the internal mechanisms and vertical cross sections of the melt chamber and nozzle mechanism.

FIG. 1 illustrates a hand held glue gun 2 illustrating one embodiment of the invention. The glue gun 2 employs a trigger-operated mechanism having a trigger 4 to advance a glue stick 6 into a glue melt chamber 8. The melt chamber 8 is held within a housing 10, the left half of which is shown in the figures to show the internal elements of the glue gun 2.

Figure 2:
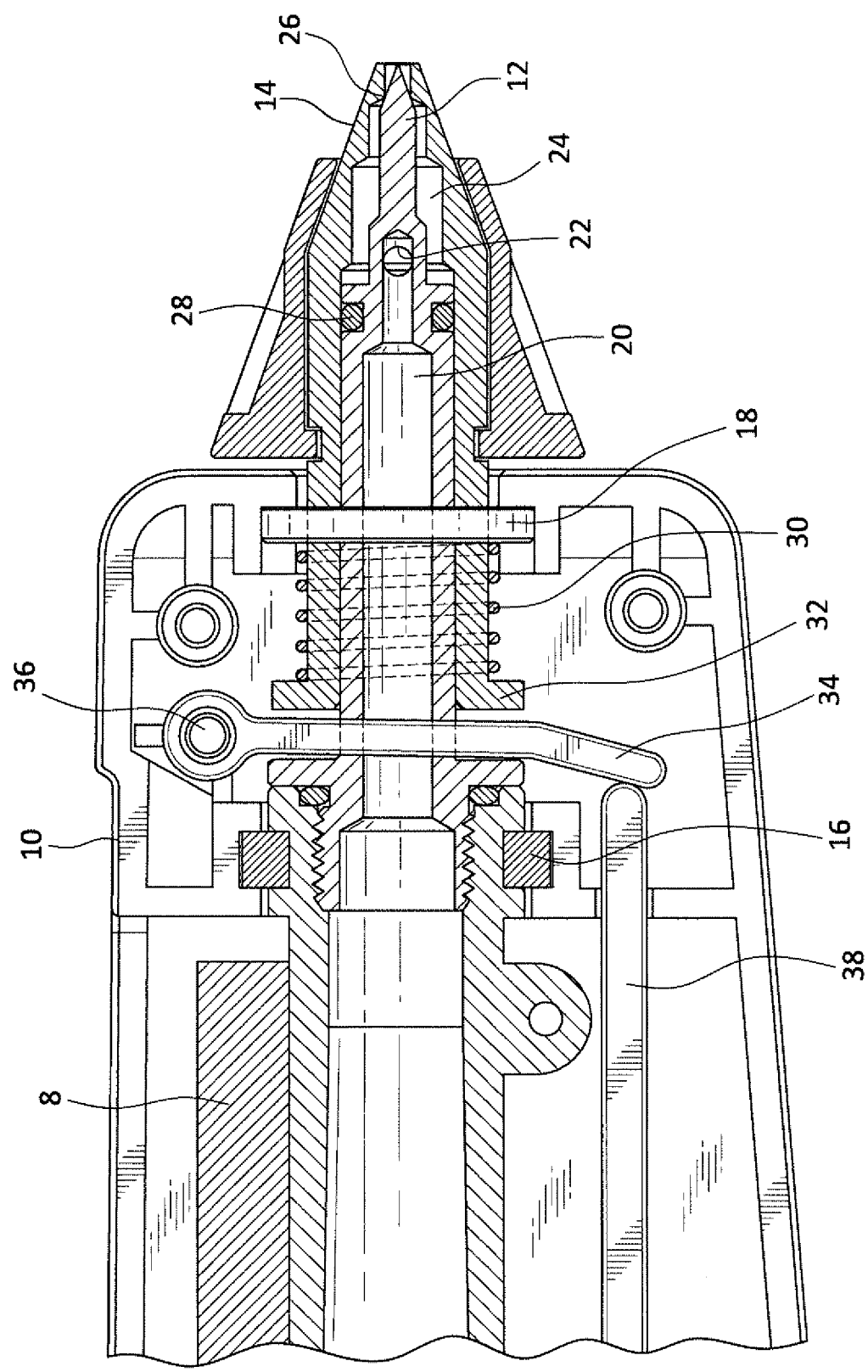
FIG. 2 is an enlarged view of the nozzle portion of the glue gun shown in FIG. 1.

The dispensing nozzle will be described with reference to FIG. 2, an enlarged view of the front part of the glue gun 2. A needle portion 12 is attached to the melt chamber 8, as by the threaded connection and is in fluid communication with the melt chamber. A thermal insulating ring 16 insulates the melt chamber 8 and one end of the needle from the housing 10 while a second insulating ring 18 insulates a forward part of the needle from the housing 10. The needle 12 is thus held stationary with respect to the housing 10. A nozzle 14 is movably attached to the needle to control flow of melted glue during dispensing. Melted glue flows from the melt chamber through channel 20 and cross-drilled passage 22 into discharge passage 24 of the nozzle. Contact between the nozzle 14 and the needle 12 forms a seal point 26, which prevents discharge of melted glue. An O-ring 28 prevents rearward leakage of glue between the needle and the nozzle, while allowing sliding movement between them. A compression spring 30 is arranged between a forward part of the housing and a flange 32 of the nozzle to urge the nozzle 14 rearward and to stop dispensing of glue by closing seal point 26.

Glue is discharged by rotating nozzle actuating lever 34 about pin 36 to engage flange 32 and slide the nozzle 14 forward along the needle 12. In this operation, the nozzle actuating lever 34 is pushed by push bar 38 to move the nozzle against the return force applied by compression spring 30. Movement of the nozzle 14 forward moves the nozzle away from the seal point 26 to open the nozzle to discharge glue through the nozzle.

Figure 3:
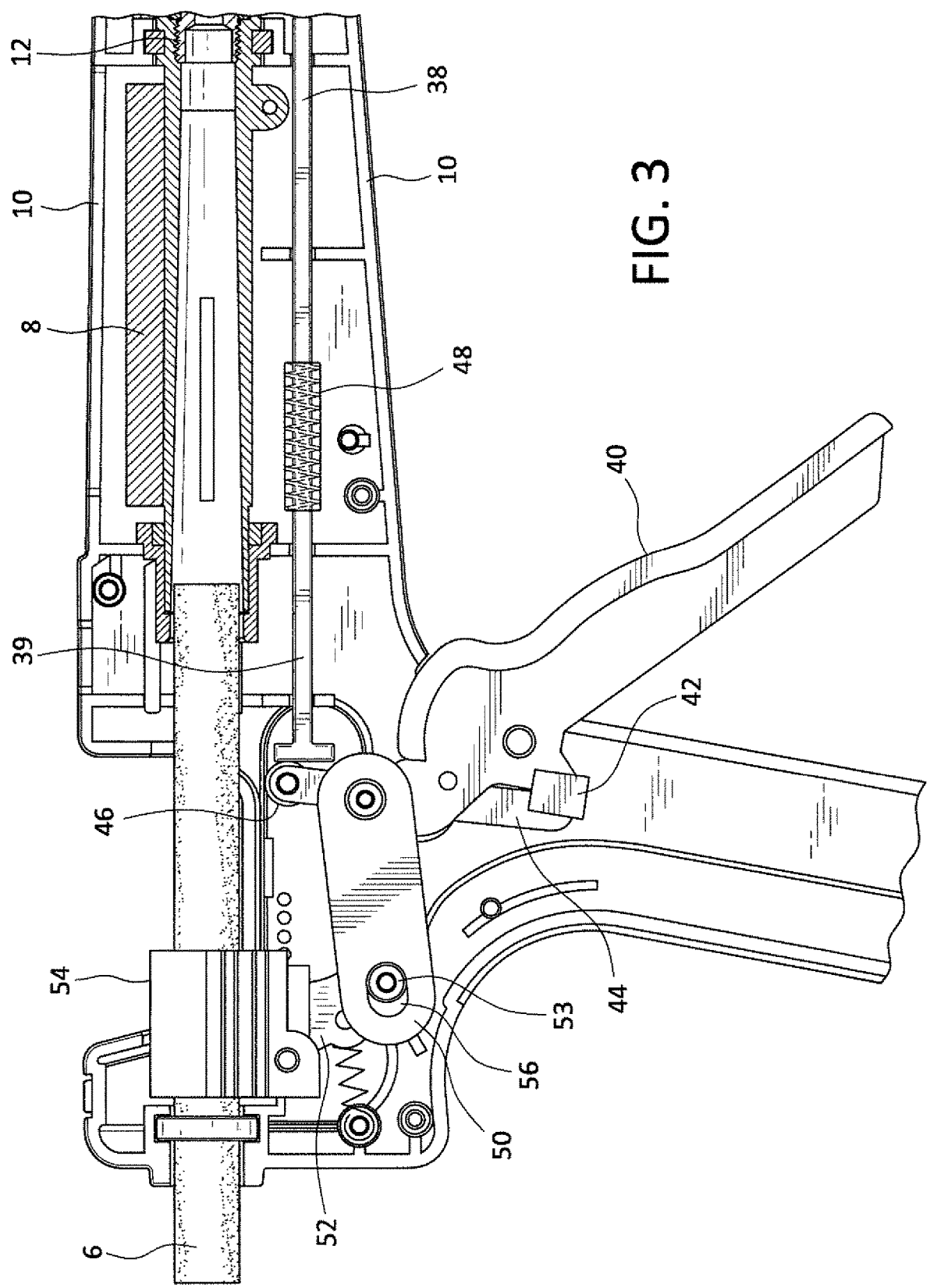
FIG. 3 is an enlarged view of the glue stick feed mechanism of the glue gun shown in FIG. 1.

With reference to FIG. 3, the glue gun 2 is provided with a trigger mechanism to dispense glue. A trigger 40 is pivotally connected to housing 10 for easy engagement and operation by a user. Trigger 40 is provided with a contact sleeve 42 that moves rearward when the trigger is squeezed to push on a lower end of a push bar actuator lever 44. The push bar actuator lever 44 is pivotally mounted to the housing such that actuation of the trigger rotates the push bar actuator lever 44 clockwise whereby a roller 46 engages rearward section 39 of the actuating lever push bar 38 and pushes it forward moving the nozzle actuating lever 34 to open the discharge nozzle as describe above.

A force limiting spring 48 is placed between forward section 38 of the lever push bar and rearward section 39 to prevent application of excessive force to the actuating lever push bar 34. Spring 48 is sufficiently stiff that to the user there is no compliance in the mechanism. The force limiting spring 48 will, however, prevent damage to the mechanism if a user were to apply an excessive force to the trigger 40 before the glue is fully melted and able to be discharged.

The trigger mechanism includes a drag link 50 connected between the trigger 40 and a glue gripper 52. The drag link 50 applies a force to the glue gripper 52 via gripper pin 53 to pivot the glue gripper into contact with the glue stick 6 and then to urge the gripper housing 54 forward to advance the glue stick 6 forward into the melt chamber 8 as explained further in U.S. Pat. No. 4,523,705.

Oblong slot 56 is provided in drag link 50 to provide a time delay between opening of the nozzle 14 by application of force to the actuating push bar 38 and application of force to the nozzle actuating lever 34 on the one hand and engagement of the glue gripper 52 and subsequent movement of the gripper housing 54 on the other. Accordingly, operation of the glue gun proceeds as follows:

(a) the operator energizes the tool to full heat and inserts a glue stick, (b) once ready, actuation of the trigger 40 by the user first applies a force to the actuating push bar 38, 39 which rotates the actuator lever 34 to push the movable nozzle portion 14 away from seal point 26 to open the nozzle, (c) the drag link 50 will then have moved forward such that the gripper pin 53 is at the rearward end of the slot 56 and applies a force to the gripper to engage the glue stick and advance the gripper housing 54 along with the glue stick 6.

The above sequence allows a needed timed delay between opening of the nozzle and advancement of the glue stick. The glue gun operates smoothly by avoiding back pressure in the melt chamber that would otherwise result from advancement of the glue stick when the nozzle is held closed by the compression spring.

It will be appreciated that the timed operation of the nozzle actuating lever 34 and the gripper housing 54 result in smooth operation of the glue gun while allowing a compression spring of greater strength than in a usual ball check valve. This increased strength in the compression spring provides a more rapid closing of the nozzle when the user releases pressure on the trigger and prevents dripping. Moreover, because the seal point is closely adjacent the nozzle tip, the volume of glue between the seal point and the tip is very small, which limits the amount of glue that could possibly drip.

Modifications within the scope of the appended claims will be apparent to those of skill in the art. For example, mechanisms other than oblong slot 56 could be used to provide delayed movement of the gripper housing such as a slackened cable. As well the oblong slot could be provided at other locations in the trigger mechanism.

I claim:

1. A hand-held hot melt glue gun comprising a melt chamber, a needle and a nozzle movable with respect to said needle operative to open or close a discharge port in fluid communication with said melt chamber, a closure element that urges said needle and nozzle toward relative positions where said discharge port is closed, an opening element for moving said nozzle with respect to said needle to relative positions where said discharge port is open, and a trigger mechanism for advancing solid glue into said melt chamber and for operating said opening element, wherein said trigger mechanism provides a time delay between opening of said discharge port and advancement of said glue into said melt chamber.

2. A hand-held hot melt glue gun according to claim 1 wherein said trigger mechanism comprises a trigger positioned to be engaged by a user, a glue stick gripper, and a link connecting said trigger with said glue stick gripper so that activation by said trigger moves said link to cause engagement of a glue stick by said gripper.

3. A hand-held hot melt glue gun according to claim 2 wherein said link is connected to said gripper by a delay mechanism.

4. A hand-held hot melt glue gun according to claim 3 wherein said delay mechanism is a slot in said link and a pin on said gripper, said pin being engaged in said slot.

* * * * *